(12) United States Patent
Kobayashi

(10) Patent No.: US 9,291,096 B2
(45) Date of Patent: Mar. 22, 2016

(54) THROTTLE CABLE LOCKING ASSEMBLY

(75) Inventor: Masanori Kobayashi, Saitama (JP)

(73) Assignee: HUSQVARNA ZENOAH CO., LTD., Saitama (JP)

( * ) Notice: Subject to any disclaimer, the term of this patent is extended or adjusted under 35 U.S.C. 154(b) by 246 days.

(21) Appl. No.: 13/878,274

(22) PCT Filed: Oct. 22, 2010

(86) PCT No.: PCT/JP2010/006256
§ 371 (c)(1),
(2), (4) Date: Apr. 8, 2013

(87) PCT Pub. No.: WO2012/053038
PCT Pub. Date: Apr. 26, 2012

(65) Prior Publication Data
US 2013/0186369 A1 Jul. 25, 2013

(51) Int. Cl.
F02B 75/00 (2006.01)
F16G 11/02 (2006.01)
A01D 34/90 (2006.01)
(Continued)

(52) U.S. Cl.
CPC ............... *F02B 75/00* (2013.01); *A01D 34/90* (2013.01); *F16C 1/103* (2013.01); *F16C 1/226* (2013.01); *F16G 11/025* (2013.01)

(58) Field of Classification Search
CPC ....... F02B 75/00; F16G 11/00; F16G 11/025; F16G 11/09; F16C 1/223; F16C 1/226
See application file for complete search history.

(56) References Cited

U.S. PATENT DOCUMENTS

| 4,452,097 A * | 6/1984 | Sunkel .......................... 74/502.4 |
| 6,591,507 B2 * | 7/2003 | Kobayashi et al. ............. 30/276 |
| 2008/0047112 A1 | 2/2008 | Hoekstra |

FOREIGN PATENT DOCUMENTS

| CN | 1365602 A | 8/2002 |
| DE | 2608640 A1 | 8/1977 |
| JP | 55-152815 U | 11/1980 |

(Continued)

OTHER PUBLICATIONS

International Search Report and Written Opinion of PCT/JP2010/006256 mailed Jul. 26, 2011.

(Continued)

*Primary Examiner* — Lindsay Low
*Assistant Examiner* — Jacob Amick
(74) *Attorney, Agent, or Firm* — Nelson Mullins Riley & Scarborough LLP

(57) ABSTRACT

A throttle cable locking assembly (16) for a power tool (1), in which the power tool (1) includes a source of power (2) having an internal combustion engine, a machine implement (4) engaged to the source of power (2), and a throttle handle (6) connected to the internal combustion engine for regulating power supply to the machine implement (4). The throttle cable locking assembly (16) includes: a cable assembly (18), the cable assembly (18) including a throttle cable (20) extending from the internal combustion engine, an outer cable (30) extending from the internal combustion engine and enclosing a portion of the throttle cable (20), and an engagement member (36) carried by a first end portion of the outer cable (30); and an adjuster bolt capable of being engaged with the engagement member (36) provided on the first end of the outer cable (30). A locking case (48) is provided for securing one end of the adjuster bolt and a portion of the engagement member (36).

11 Claims, 6 Drawing Sheets

(51) Int. Cl.
   *F16C 1/10*   (2006.01)
   *F16C 1/22*   (2006.01)

(56) References Cited

FOREIGN PATENT DOCUMENTS

| JP | S5841174 A | 3/1983 |
|---|---|---|
| JP | 2002213258 A | 7/2002 |
| JP | 200383096 A | 3/2003 |
| JP | 2003519747 A | 6/2003 |
| JP | 2006112513 A | 4/2006 |
| JP | 2007309347 A | 11/2007 |

OTHER PUBLICATIONS

Chapter II International Preliminary Report on Patentability of PCT/JP2010/006256 mailed Jan. 29, 2013.

* cited by examiner

THROTTLE CABLE LOCKING ASSEMBLY

TECHNICAL FIELD

The present invention relates to hand-held power tools and especially relates to a suitable arrangement for locking a throttle cable to an internal combustion engine of a hand-held power tool.

BACKGROUND ART

Hand-held power tools, such as a bush cutter, a line trimmer etc are well known in the art. The hand-held power tools generally include a source of power including an internal combustion engine, a machine implement connected to the source of power, and a throttle control mechanism. The machine implement receives power from the internal combustion engine. The throttle control mechanism regulates the supply of charge to the internal combustion engine thereby regulating the amount of power produced by the internal combustion engine. Conventionally, the throttle control mechanism includes a handle member connected to one of the source of power or the machine implement and a throttle cable. The throttle control mechanism extends from the handle member and connects to a stationary bracket of the internal combustion engine through an adjuster bolt. The operation of the handle member operates the throttle cable. The operation of the throttle cable connected to the internal combustion engine actuates a throttle to move, for altering the supply of charge to the internal combustion engine. However, it is frequently seen that the throttle cable gets accidentally loosened or detached from the adjuster bolt connected to the stationary bracket, thus actuating or accelerating the throttle undesirably. Such undesired actuating of the throttle frequently poses a potential threat to a user. Further, such detachment or loosening of the throttle cable from the throttle bracket severely hampers proper operation of the throttle with the operation of the throttle handle. Moreover, such detachment or loosening of the throttle cable from the throttle bracket also creates a need for again attaching the throttle cable to the throttle bracket.

Various measures have been adopted in the art to reduce or eliminate the potential problems arising from the accidental actuation of the throttle. One way to reduce or eliminate such problems is to employ an additional locknut for locking the throttle cable to the throttle bracket. Another known measure is to employ a threaded hole created on the adjuster bolt for fixing the adjuster bolt on an end portion of the throttle cable.

Additionally, U.S. Pat. No. 4,761,939 (hereinafter referred to as '939 Patent), issued on Aug. 9, 1988 and assigned to Andreas Stihl, titled "Brushcutter" discloses a Brushcutter having an improved handle member. Further, U.S. Pat. No. 6,591,507 (hereinafter referred to as '507 Patent), issued on Jul. 13, 2003 and assigned to Honda Kogyo Kabushiki Kaisha, titled "Operational lever for bush cutter" discloses an operational lever for a bush cutter.

SUMMARY OF INVENTION

Technical Problem

However, when an additional locknut is employed, an additional effort is required to fix the throttle cable. Specifically, a tool such as a wrench is required in such cases to fix the throttle cable, which often causes inconvenience to the user. However, when the threaded hole is created on the adjuster bolt, an additional screw is inserted into the threaded hole. Such need of installing the additional screw in the adjuster bolt also proves to be an inconvenient and cumbersome exercise for the users. Further, the utilization of the additional locknut or the additional screws in the adjuster bolt also carries an additional cost associated with it. Further, the patents listed above also fail to address abovementioned problems.

In light of the foregoing, an object of the invention is to provide an arrangement for locking the throttle cable to the internal combustion engine of a hand-held power tool which is easy and convenient to install. Further, it is another object of the present invention to address the problems associated with the accidental detachment or loosening of the throttle cable.

Solution to Problem

A throttle cable locking assembly, according to an aspect of the invention is used for a power tool, the power tool including a source of power having an internal combustion engine, a machine implement engaged to the source of power, and a throttle handle connected to the internal combustion engine for regulating power supply to the machine implement, the throttle cable locking assembly including: a cable assembly, the cable assembly including: a throttle cable extending from the internal combustion engine, an outer cable extending from the internal combustion engine and enclosing a portion of the throttle cable, and an engagement member carried by a first end portion of the outer cable; and an adjuster bolt capable of being engaged with the engagement member provided on the first end of the outer cable; a locking case is provided for securing one end of the adjuster bolt and a portion of the engagement member.

According to an aspect of the present invention, the securing of the locking case over the one end of the adjuster bolt and the portion of the engagement member precludes any possibility of accidental disengagement and loosening of the engagement member from the adjusting bolt. This aspect of the preset invention therefore prevents an unexpected increase in the rotational speed resulting from a pullout. The throttle cable locking further precludes the need of employing other adjusting nuts, thereby precluding the need of incurring the cost associated with them.

In the throttle cable locking assembly, according to an aspect of the present invention, a threaded portion of the adjuster bolt is configured to be removably connected with the internal combustion engine.

In the throttle cable locking assembly, according to an aspect of the present invention, the locking case includes: a first member configured to be engaged with each of the engagement member and the adjuster bolt; and a second member hingedly joined to the first member, the second member being configured to be moved about the hinged joint for locking the engagement member and the adjuster bolt.

In the throttle cable locking assembly, according to an aspect of the present invention, an internal surface of the first member and the second member is configured to be integrated with a portion of an outer surface of the adjuster bolt. Thus, the adjuster bolt can be conveniently adjusted to maintain proper connection with the internal combustion engine without having to employ any additional tools. Accordingly, the cable assembly and the internal combustion engine remain properly engaged, thus enabling proper throttling of the internal combustion engine by the cable assembly.

In the throttle cable locking assembly, according to an aspect of the present invention, the first member of the locking case includes a locking member and the second member of the locking case includes a complementary locking member. The locking member is adapted to be snap-fitted to the complementary locking member for locking the first member with the second member. Therefore, the locking case can be conveniently and quickly installed for locking the cable assembly and the adjustment bolt.

In the throttle cable locking assembly, according to an aspect of the present invention, the engagement member of the cable assembly includes at least one flange adapted to engage with the first member and the second member of the locking case.

In the throttle cable locking assembly, according to an aspect of the present invention, an outer diameter of the at least one flange is bigger than the outer diameter of a main body of the engagement member.

In the throttle cable locking assembly, according to an aspect of the present invention, the locking case is attachable to the adjuster bolt in a one-touch operation.

In the throttle cable locking assembly, according to an aspect of the present invention, further includes at least one locknut for adjusting the connection between the adjuster bolt and the internal combustion engine.

DESCRIPTION OF EMBODIMENTS

Figure 1A:
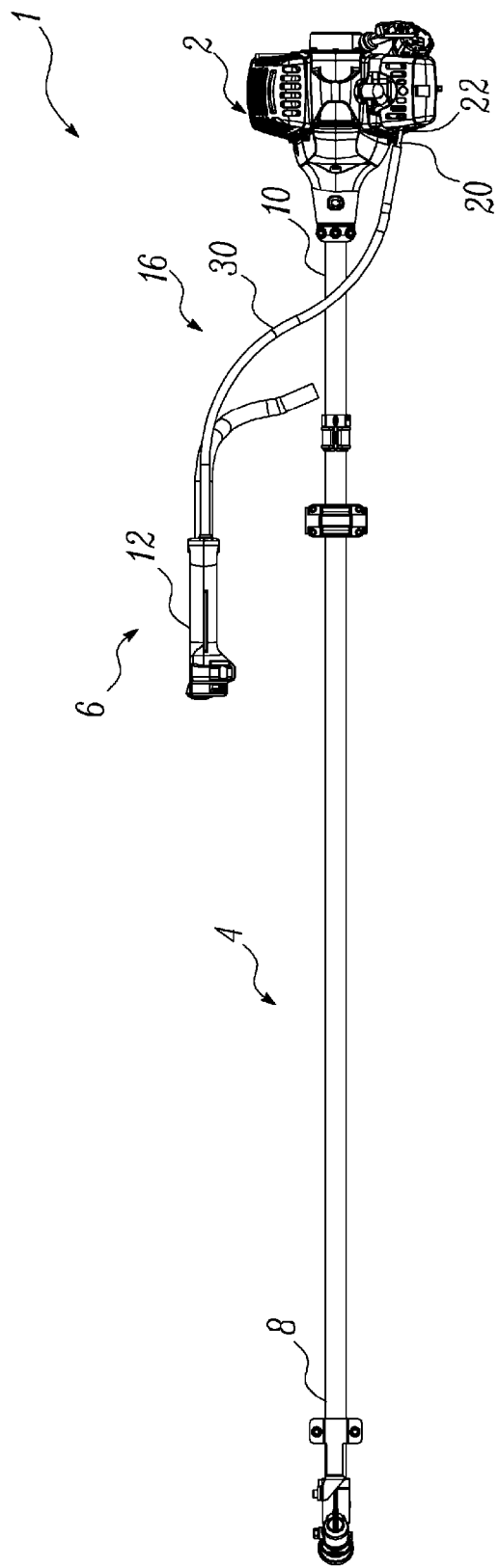
FIG. 1A is a view of a hand-held power tool utilizing a throttle cable locking assembly, according to an embodiment of the invention.

An exemplary embodiment of the invention will be described below with reference to FIGS. 1A through 5. Incidentally, same reference numeral will be used corresponding to same components in the entire description.

Figure 1B:
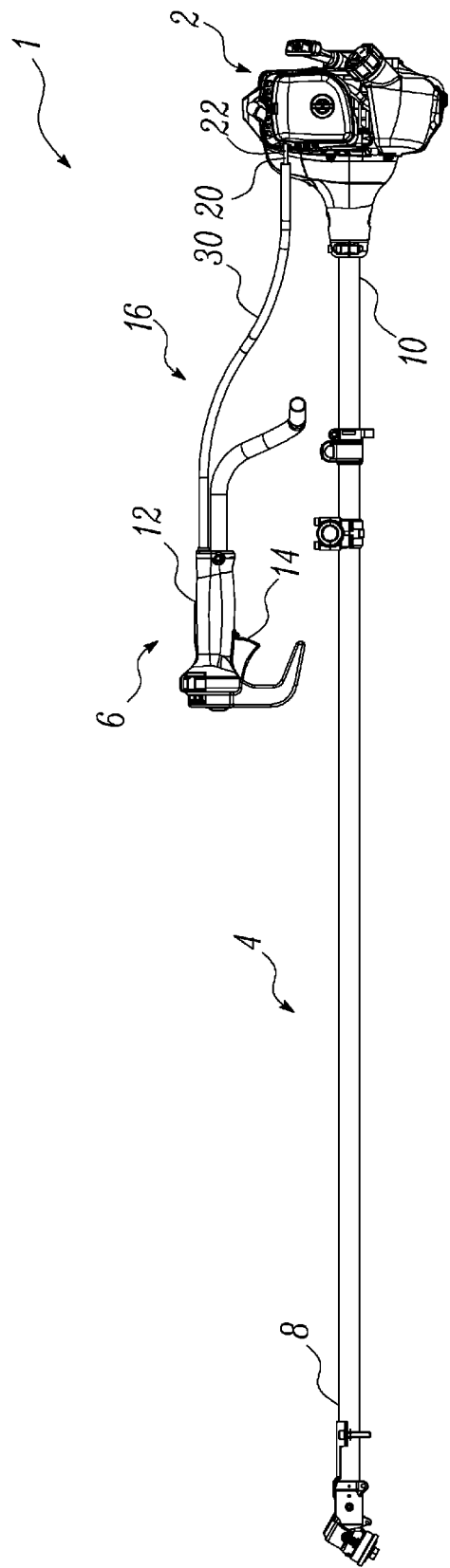
FIG. 1B is another view of the hand-held power tool utilizing the throttle cable locking assembly, according to an embodiment of the invention.

As shown in FIGS. 1A and 1B, a hand-held power tool 1 (will be simply referred to as a 'power tool 1' hereinafter), according to this exemplary embodiment includes: a source of power 2, a machine implement 4 engaged to the source of power 2, and a throttle handle 6 connected to the source of power 2. The source of power 2 encloses an internal combustion engine (not visible in FIGS. 1A and 1B). The internal combustion engine may be a two stroke engine, a four stroke engine, a petrol engine or a diesel engine. The machine implement 4 has an elongated cylindrical structure having a first end portion 8, a second end portion 10 opposite to the first end portion 8 and a stem portion (not numbered) connecting the first end portion 8 and the second end portion 10. The first end portion 8 of the machine implement 4 carries a means for removably connecting a tool (not shown), such as, but not limited to, a cutter. The stem portion of the machine implement 4 may include an additional handle (not shown) for facilitating handling of the power tool 1. Optionally, one or more brackets (not numbered) may also be provided on the stem portion and/or the Source of power 2, for attaching a harness (not shown) to the power tool 1. The throttle handle 6 includes a handle member 12 and one or more actuation knobs, such as a throttle lever 14 carried by the handle member 12. The handle member 12 facilitates handling of the power tool 1. Further, the throttle lever 14 of the throttle handle 6 regulates the operation of the internal combustion engine. Furthermore, a throttle cable locking assembly 16 connects the throttle handle 6 to the internal combustion engine for regulation of the operation of the internal combustion engine.

The throttle cable locking assembly 16 includes a cable assembly 18 (not numbered in FIGS. 1A and 1B). The operation of the throttle lever 14 operates the cable assembly 18. The operation of the cable assembly 18 regulates the power supplied by the internal combustion engine to the machine implement 4.

Figure 2:
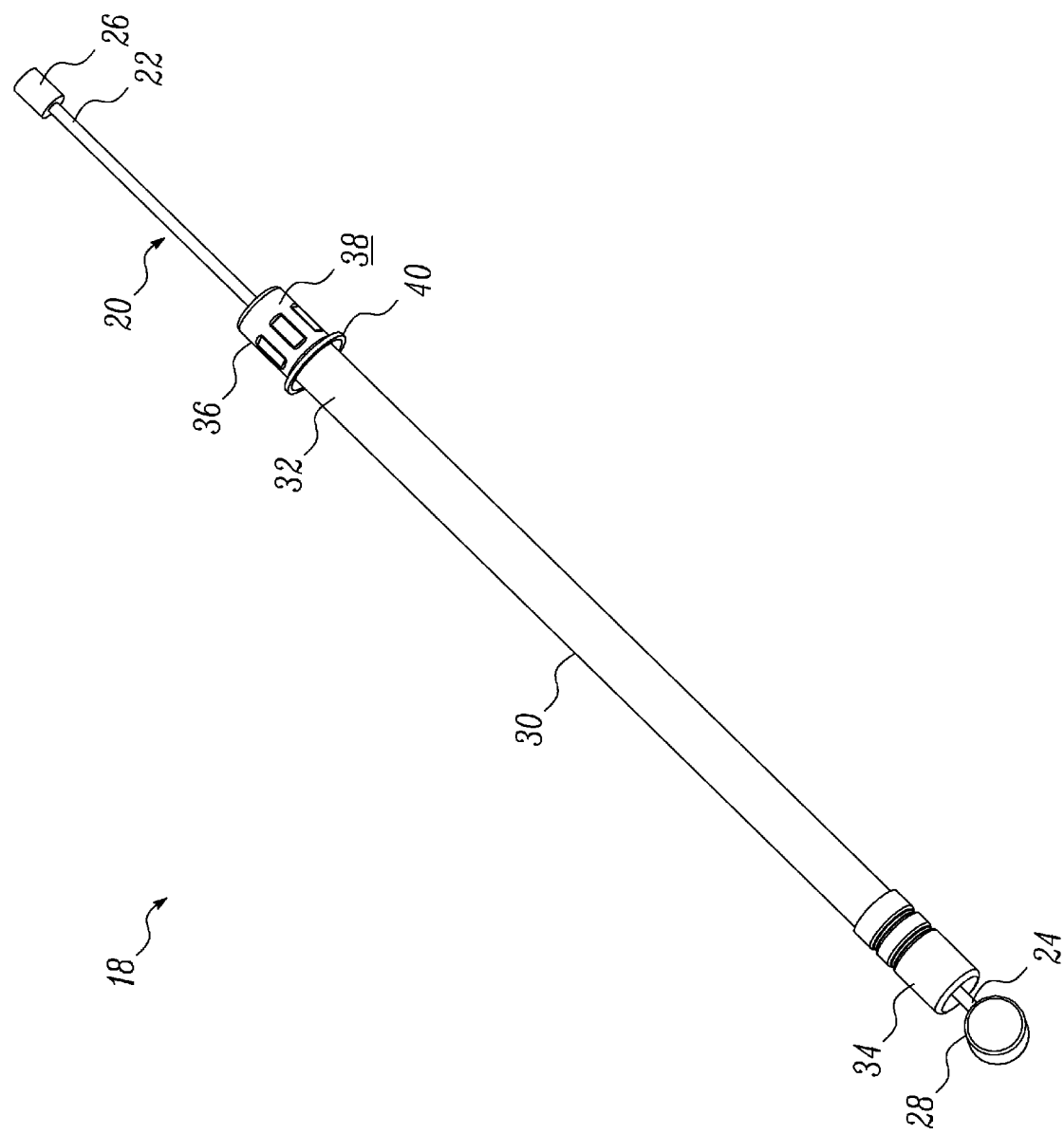
FIG. 2 is a perspective view of a cable assembly of the throttle cable locking assembly, according to an embodiment of the invention.

FIG. 2, is a perspective view of the cable assembly 18 of the throttle cable locking assembly 16 for the power tool 1, according to an embodiment of the present invention. The cable assembly 18 includes a throttle cable 20 extending from the internal combustion engine when attached to the internal combustion engine (shown in FIG. 3). Specifically, a first end portion 22 of the throttle cable 20 is removably connected to the internal combustion engine, and a second end portion 24 of the throttle cable 20 is connected to the throttle lever 14 of the throttle handle 6. The first end portion 22 and the second end portion 24 (not shown in FIGS. 1A and 1B) of the throttle cable 20 include an attaching tab 26 and 28 respectively, for assisting attachment of the first end portion 22 and the second end portion 24 to the internal combustion engine and the throttle handle 6 respectively. The cable assembly 18 further includes an outer cable 30 extending from the internal combustion engine. Specifically, a first end portion 32 of the outer cable 30 is connected to the internal combustion engine while a second end portion 34 of the outer cable 30 is connected to the throttle handle 6 (shown in FIG. 3). The outer cable 30 has a hollow passage (not shown) extending throughout the length thereof, which encloses a portion of the throttle cable 20. Such enclosing of the throttle cable 20 within the hollow passage enables the throttle cable 20 to move within the outer cable 30 relative to the outer cable 30 with the operation of the throttle lever 14. The cable assembly 18 furthermore includes an engagement member 36 carried by the first end portion 32 of the outer cable 30. The engagement member 36 also includes a through hole (not numbered) which is aligned with the hollow passage of the outer cable 30 for allowing the throttle cable 20 to pass therethrough. A portion of an external surface 38 of the engagement member 36 may have a partially hexagonal configuration. Alternatively, the portion of the external surface 38 of the engagement member 36 may have a partially pentagonal or a quadrilateral configuration. It may be apparent to a person who is ordinarily skilled in the art that the portion of the external surface 38 of the engagement member 36 may be of any shape without deviating from the scope of the present invention. Additionally, the engagement member 36 further includes at least one flange, such as a flange 40. An outer diameter of the flange 40 is bigger than the outer diameter of the main body of the engagement member 36. In an alternative embodiment of the present invention, the outer cable 30 of the cable assembly 18 includes a portion of different diameter (not illustrated). The different diameter may be larger such that the portion works as the flange 40.

Figure 3:
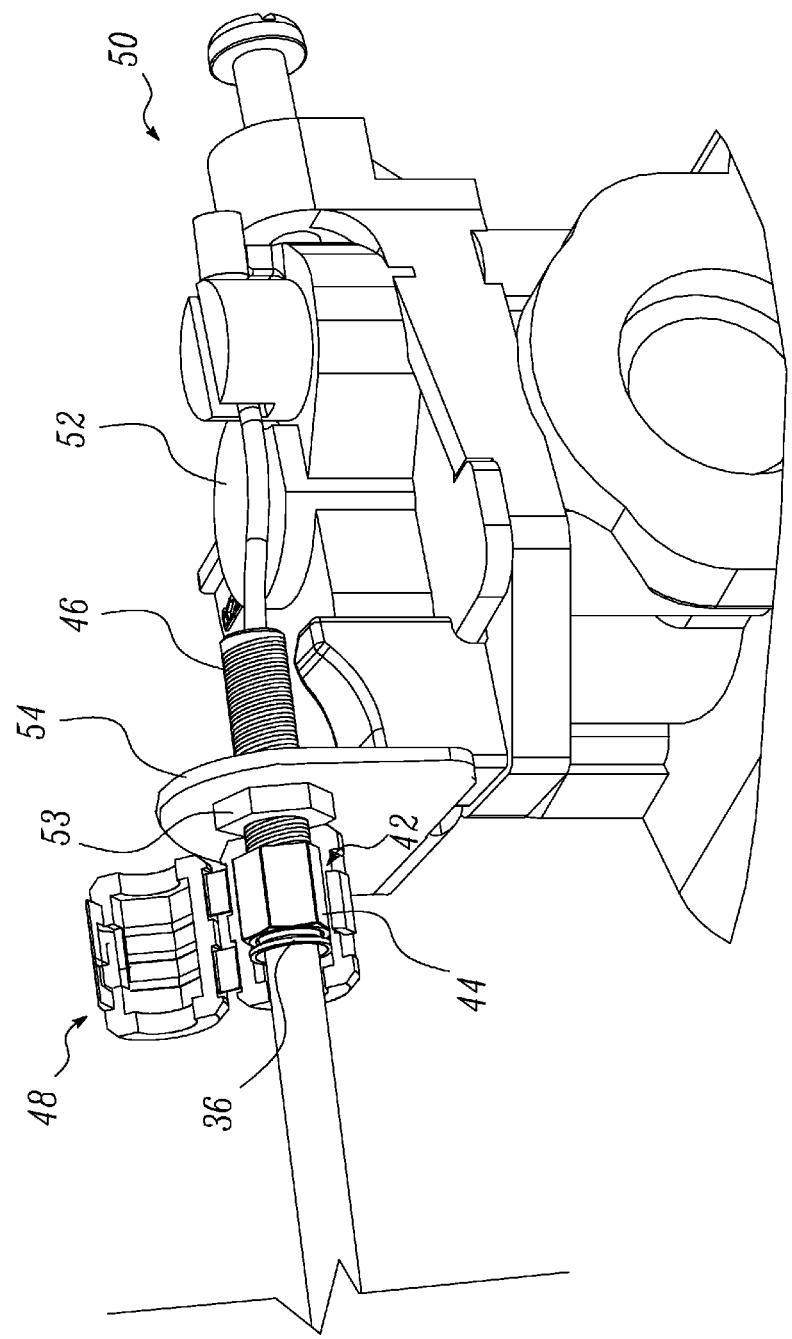
FIG. 3 is a view of a portion of the throttle cable locking assembly connected to an internal combustion engine of the hand-held power tool, according to an embodiment of the invention.

FIG. 3 illustrates a portion of the cable assembly 18 connected to the internal combustion engine of the power tool 1, according to an embodiment of the invention. The throttle cable locking assembly 16 further includes an adjuster bolt 42. The adjuster bolt 42 is capable of being engaged with the engagement member 36 at an end portion 44 thereof. An opposite end portion 46 of the adjuster bolt 42 is capable of being connected to the internal combustion engine.

The throttle cable locking assembly 16 furthermore includes a locking case 48. The locking case 48 is provided for securing one end of the adjuster bolt 42 and a portion of the engagement member 36. Such securing of the one end of the adjuster bolt 42 and the portion of the engagement member 36 locks the adjuster bolt 42 with respect to the engagement member 36. This locking precludes any possibility of accidental disengagement or loosening of the adjuster bolt 42 and the engagement member 36.

As shown in FIG. 3, the internal combustion engine includes a throttle control mechanism 50 for regulating the speed of the internal combustion engine. The throttle control mechanism 50 includes a swiveling member 52 and a stationary bracket 54. The swiveling member 52 is configured to be rotated about a swivel point (not shown). The swiveling member 52 is connected to the first end portion of the throttle cable 20. The operation of the throttle lever 14 causes the throttle cable 20 to move. The movement of the throttle cable imparts movement to the swiveling member 52. The swiveling movement of the swiveling member 52 regulates the supply of fuel to a cylinder of the internal combustion engine. The regulation of the supply of the fuel to the cylinder of the internal combustion engine affects the operating speed of the internal combustion engine. Clearly, since the machine implement 4 is connected to the internal combustion engine, the regulation of the operating speed of the internal combustion engine may regulate the operating speed of the machine implement 4. Therefore, the movement of the swiveling member 52 regulates the speed of the machine implement 4. However, the stationary bracket 54 remains immobile irrespective of the movement of the swiveling member 52. The stationary bracket 54 includes a threaded slot (not numbered) for facilitating its connection to the adjuster bolt 42.

Figure 4:
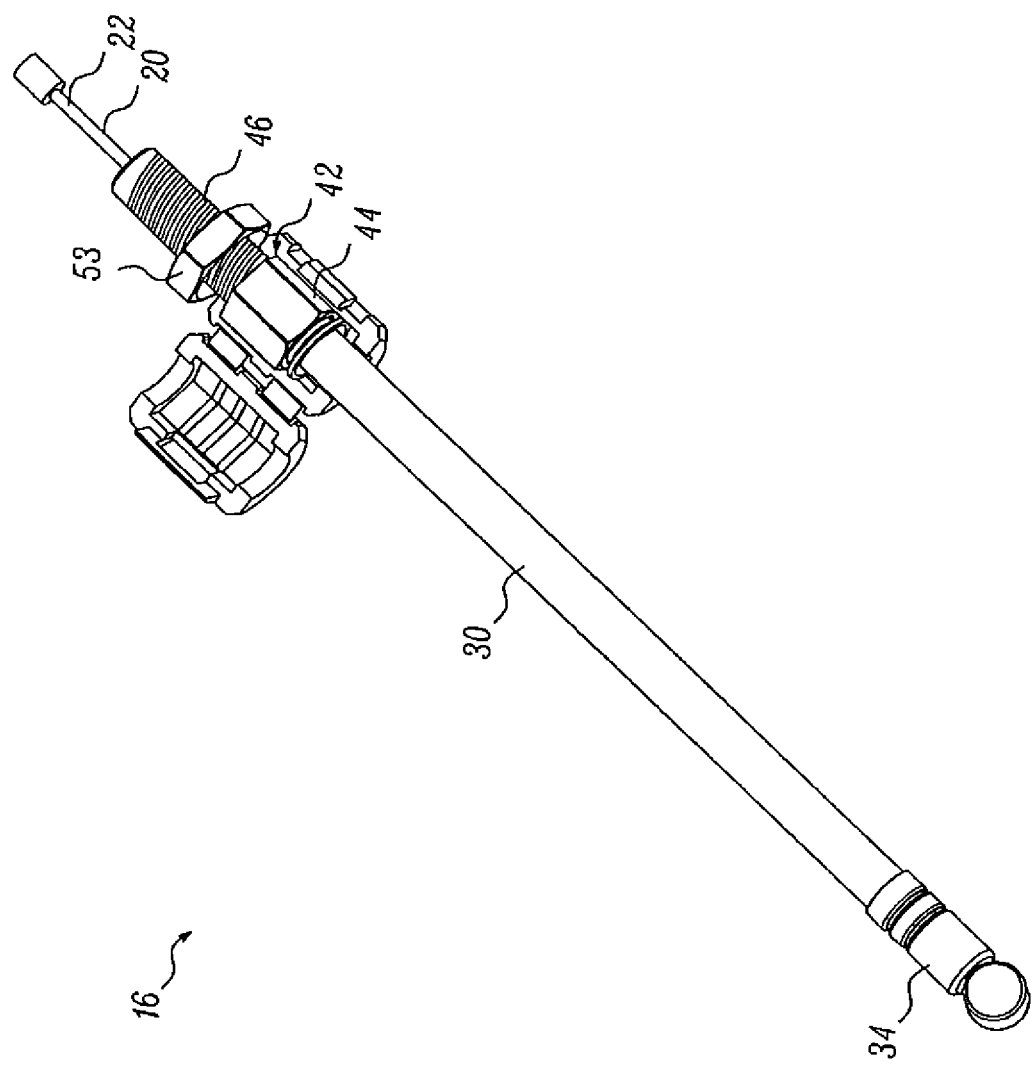
FIG. 4 is a perspective view of the throttle cable locking assembly, according to an embodiment of the invention.

FIG. 4 shows the end portion 44 of the adjuster bolt 42 including a hexagonal outer surface. The opposite end portion 46 of the adjuster bolt 42 includes a threaded portion formed on an outer surface thereof. Each of the end portion 44 and the opposite end portion 46 includes a concentric hole (not numbered). The end portion 44 is capable of being received over the first end portion 32 of the outer cable 30. The threaded portion is capable of being attached to the internal combustion engine. Specifically, the threaded portion on the opposite end portion 46 of the adjuster bolt 42 is detachably connected to the stationary bracket 54 of the throttle control mechanism 50 (shown in FIG. 3).

Additionally, at least one locknut 53 is coupled to the adjuster bolt 42. The locknut 53 is configured to be coupled to the threaded portion of the opposite end portion 46. The locknut 53 enables the adjuster bolt 42 to be locked to the stationary bracket 54 of the throttle control mechanism 50. The concentric holes of the end portion 44 and the opposite end portion 46 form an elongated hollow channel extending throughout the length of the adjuster bolt 42. The first end portion 22 of the throttle cable 20 also passes through the concentric hole.

During utilization of the power tool 1 for regulating the speed of the internal combustion engine, a user operates the throttle lever 14. The operation of the throttle lever 14 moves the throttle cable 20 with respect to the outer cable 30 and the stationary bracket 54. Such movement of the throttle cable 20 operates the swiveling member 52, thus regulating the speed of the machine implement 4.

Figure 5:
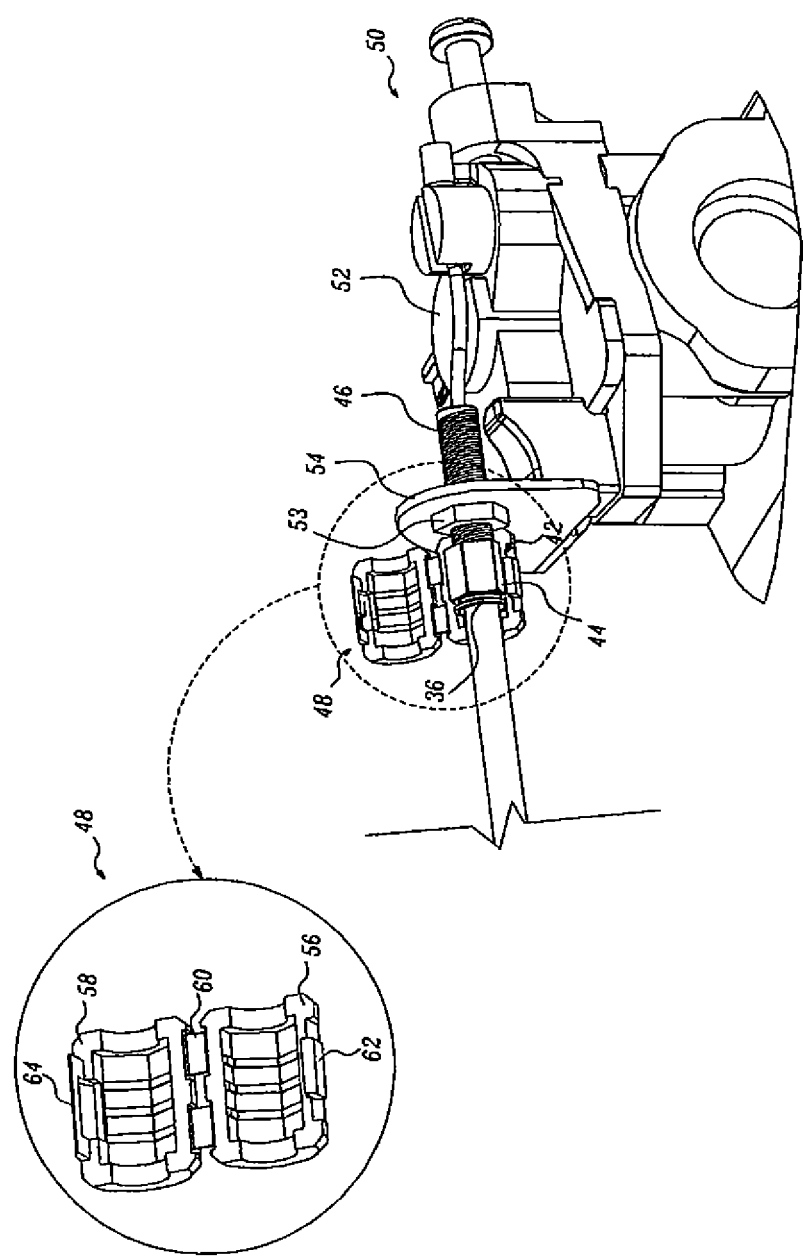
FIG. 5 is a view of a locking case along with the throttle cable locking assembly connected to an internal combustion engine, according to an embodiment of the invention.

FIG. 5 shows a locking case along with the throttle cable locking assembly connected to an internal combustion engine, according to an embodiment of the present invention. The locking case 48 includes a first member 56 and a second member 58. The first member 56 is configured to be engaged with each of the engagement member 36 and the adjuster bolt 42. The second member 58 is hingedly joined to the first member 56 at a hinged joint 60. The second member 58 is configured to be moved about the hinged joint 60 for locking the engagement member 36 and the adjuster bolt 42.

A locking member 62 is carried by the first member 56 of the locking case 48 while a complementary locking member 64 is carried by the second member 58. The locking member 62 is adapted to be snap-fitted to the complementary locking member 64. The snap-fitting of the locking member 62 and the complementary locking member 64 locks the first member 56 with the second member 58. Specifically, the movement of the second member 58 about the hinged joint 60 aligns the locking member 62 with the complementary locking member 64 and subsequent movement of the second member 58 and/or the first member 56 snap fits the locking member 62 to the complementary locking member 64. Those of ordinary skill in the art will appreciate that the hinged joint 60 will facilitate the movement of each of or either of the first member 56 and the second member 58 with respect to one another. Further, such movement of the first member 56 and the second member 58 also facilitates unlocking of the locking member 62 and the complementary locking member 64.

Incidentally, an internal surface of the first member 56 and the second member 58 is configured to be integrated with a portion of an outer surface of the adjuster bolt 42. Further, the internal surface of the first member 56 and the second member 58 is configured to be integrated with a portion of the engagement member 36.

During the utilization of the throttle cable locking assembly 16, the first end portion 22 of the throttle cable 20 is connected to the swiveling member 52. Simultaneously, the threaded portion on the second end portion of the adjuster bolt 42 is connected to the stationary bracket 54 of the throttle control mechanism 50 while the first end portion of the adjuster bolt 42 is received over the end portion of the engagement member 36. Thereafter, in order to securely attach the adjuster bolt 42 with the engagement member 36, the first member 56 is engaged with each of the engagement member 36 and the adjuster bolt 42. Subsequently, the second member 58 is moved about the hinged joint 60 for locking the engagement member 36 and the adjuster bolt 42. Such locking of the engagement member 36 and the adjuster bolt 42 may be achieved by a one touch operation. Further, the adjuster bolt 42 can be conveniently adjusted by rotating the locking case 48 for maintaining its proper connection with the internal combustion engine. In an embodiment of the present invention, each of the first member 56 and the second member 58 engages with the flange and the first end portion of the adjuster bolt 42.

The above-described exemplary embodiment provides the following advantages.

The securing of the locking case 48 over the first end of the adjuster bolt 42 and the portion of the engagement member 36 precludes any possibility of accidental disengagement of the engagement member 36 from the adjuster bolt 42, thus preventing an undesired increase in rotational speed of the internal combustion engine resulting from a pullout. Locking of the throttle cable 20 further precludes the need of employing other adjusting nuts, thereby precluding the need of incurring the cost associated with them. The securing of the locking case 48 ensures proper connection of the throttle cable 20 and the internal combustion engine thus enabling proper throttling of the internal combustion engine by the cable assembly 18.

INDUSTRIAL APPLICABILITY

The throttle cable locking assembly 16 according to the invention is suitably applied to various power tools such as a mower and a chain saw.

REFERENCE SIGNS LIST

1 . . . d-held power tool (power tool)
2 . . . Source of power
4 . . . Machine implement
6 . . . Throttle handle
8 . . . First end portion of the machine implement
10 . . . Second end portion
12 . . . Handle member
14 . . . Throttle lever
16 . . . Throttle cable locking assembly
18 . . . Cable assembly
20 . . . Throttle cable
22 . . . First end portion of the throttle cable 20
24 . . . Second end portion of the throttle cable 20
26, 28 . . . Attaching tabs
30 . . . Outer cable
32 . . . First end portion of the outer cable 30
34 . . . Second end portion of the outer cable 30
36 . . . Engagement member
38 . . . An external surface of the engagement member 36
40 . . . Flange
42 . . . Adjuster bolt
44 . . . End portion of the adjuster bolt 42
46 . . . Opposite end portion of the adjuster bolt 42
48 . . . Locking case
50 . . . Throttle control mechanism
52 . . . Swiveling member
53 . . . Locknut
54 . . . Stationary bracket
56 . . . First member
58 . . . Second member
60 . . . Hinged joint
62 . . . Locking member
64 . . . Complementary locking member

The invention claimed is:

1. A throttle cable locking assembly configured for a power tool comprising a source of power having an internal combustion engine, a machine implement engaged to the source of power, and a throttle handle connected to the internal combustion engine for regulating power supply to the machine implement, the throttle cable locking assembly comprising:
a cable assembly, the cable assembly comprising:
a throttle cable extending from the internal combustion engine,
an outer cable extending from the internal combustion engine and enclosing a portion of the throttle cable,
an engagement member carried by a first end portion of the outer cable; and
an adjuster bolt capable of being engaged with the engagement member provided on the first end portion of the outer cable, and
a locking case configured for securing one end of the adjuster bolt and a portion of the engagement member preventing disengagement and loosening of the engagement member from the adjusting bolt, wherein the locking case comprises:
a first member configured to be engaged with each of the engagement member and the adjuster bolt; and
a second member hingedly jointed to the first member, the second member being configured to be moved about a hinged joint for locking the engagement member and the adjuster bolt, wherein an internal surface of the first member and an internal surface of the second member is configured to be integrated with a portion of an outer surface of the adjuster bolt and with a portion of the engagement member so that the adjuster bolt is adjustable by rotating the locking case.

2. The throttle cable locking assembly according to claim 1, wherein a threaded portion of the adjuster bolt is configured to be removably connected with the internal combustion engine.

3. The throttle cable locking assembly according to claim 1, wherein the first member includes a locking member and the second member includes a complementary locking member.

4. The throttle cable locking assembly according to claim 3, wherein the locking member is adapted to be snap-fitted to the complementary locking member for locking the first member with the second member.

5. The throttle cable locking assembly according to claim 1, wherein the engagement member of the cable assembly comprises at least one flange adapted to engage with the first member and the second member of the locking case.

6. The throttle cable locking assembly according to claim 5, wherein an outer diameter of the at least one flange is bigger than the outer diameter of a main body of the engagement member.

7. The throttle cable locking assembly according to claim 1, wherein the locking case is attachable to the adjuster bolt in a one-touch operation.

8. The throttle cable locking assembly according to claim 1 further comprising at least one locknut for adjusting the connection between the adjuster bolt and the internal combustion engine.

9. The throttle cable locking assembly according to claim 1, wherein the adjuster bolt comprises a thread end and an adjustment end, wherein the adjustment end comprised a hexagonal outer surface.

10. The throttle cable locking assembly according to claim 1, wherein a portion of external surface of the engagement member comprises a hexagonal configuration.

11. The throttle cable locking assembly according to claim 1, wherein the adjuster bolt comprises a thread end and an adjustment end, wherein the adjustment end comprised a hexagonal outer surface, wherein a portion of external surface of the engagement member comprises a hexagonal configuration, and wherein an internal surface of a first member and second member of the locking case is configured to be integrated with the hexagonal adjustment end the adjuster bolt and the hexagonal portion of the external surface of the engagement member.

* * * * *